(12) United States Patent
Hayashi et al.

(10) Patent No.: US 8,879,007 B2
(45) Date of Patent: Nov. 4, 2014

(54) PROJECTOR COMPRISING AN EXPANDING AND CONTRACTING MEMBER CONFIGURED TO MOVE A HOLDING DEVICE WHEN A TEMPERATURE IS CHANGED

(71) Applicant: Seiko Epson Corporation, Tokyo (JP)

(72) Inventors: Daisuke Hayashi, Matsumoto (JP); Kunihisa Nakamura, Iida (JP); Takeshi Utagawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/947,667

(22) Filed: Jul. 22, 2013

(65) Prior Publication Data

US 2013/0300951 A1    Nov. 14, 2013

Related U.S. Application Data

(63) Continuation of application No. 12/762,710, filed on Apr. 19, 2010, now Pat. No. 8,537,288.

(30) Foreign Application Priority Data

Apr. 21, 2009   (JP) .................................. 2009-102748

(51) Int. Cl.
| G02F 1/1335 | (2006.01) |
| G03B 3/00 | (2006.01) |
| G02B 7/02 | (2006.01) |
| G02F 1/13 | (2006.01) |
| H04N 9/31 | (2006.01) |

(52) U.S. Cl.
CPC ................ *G02F 1/1313* (2013.01); *G03B 3/00* (2013.01); *H04N 9/3144* (2013.01); *H04N 9/317* (2013.01); *H04N 9/3197* (2013.01)
USPC ................ 349/5; 353/101; 359/813

(58) Field of Classification Search
CPC ........................ H04N 9/3167; H04N 5/7441
USPC ............ 349/5–10; 353/85, 87, 100, 101, 119; 359/813, 814
See application file for complete search history.

(56) References Cited

U.S. PATENT DOCUMENTS

| 6,631,994 B2 | 10/2003 | Suzuki et al. |
| 7,612,951 B2 | 11/2009 | Masui et al. |
| 2002/0089612 A1* | 7/2002 | Okada et al. ....................... 349/5 |
| 2006/0007556 A1* | 1/2006 | Okajima et al. ............... 359/649 |

FOREIGN PATENT DOCUMENTS

| JP | A-2002-207168 | 7/2002 |
| JP | A-2004-264570 | 9/2004 |
| JP | A-2008-026864 | 2/2008 |
| JP | A-2008-058654 | 3/2008 |

* cited by examiner

*Primary Examiner* — Paul Lee
(74) *Attorney, Agent, or Firm* — Oliff PLC

(57) ABSTRACT

A projector includes: a display device which modulates illumination light; a projection lens which projects modulation light produced by the display device; and a holding device which has a holder member supporting the display device, a frame member supporting the projection lens and functions as a base capable of supporting the holder member, and an expanding and contracting member disposed between the frame member and the display device, wherein a temperature coefficient for the expansion and contraction of the expanding and contracting member in the direction of the optical axis of the projection lens corresponds to a temperature coefficient for the increase and decrease of the focal distance of the projection lens.

10 Claims, 9 Drawing Sheets

PROJECTOR COMPRISING AN EXPANDING AND CONTRACTING MEMBER CONFIGURED TO MOVE A HOLDING DEVICE WHEN A TEMPERATURE IS CHANGED

This is a Continuation of application Ser. No. 12/762,710 filed Apr. 19, 2010, which claims foreign benefit to JPA 2009-102748 filed Apr. 21, 2000. The disclosures of the prior applications are hereby incorporated by reference herein in their entirety.

BACKGROUND

1. Technical Field

The present invention relates to a projector which forms an image by using illumination light applied to a liquid crystal light valve from an illumination device, and projects the formed image on a screen.

2. Related Art

A type of projection lens unit incorporated in a projector and having a moving lens barrel movable in the direction of the optical axis shifts the moving lens barrel in a direction away from an image forming optical element by the effect of thermal deformation of bimetal so as to correct the change of the focus position (see JP-A-2008-26864).

Moreover, a type of projection side optical system incorporated in a projector has a heat conductive lens barrel made of highly heat conductive material and disposed at a fixing position of a laminated lens included in plural lenses of the optical system to prevent shift or separation of the laminated lens (see JP-A-2008-58654).

Furthermore, there are a type which includes a cam ring having a temperature coefficient different from that of a correction barrel and cancels the shift of the focus by the movement of the cam ring (see JP-A-2004-264570), and a type which shifts a refraction optical lens in the direction of the optical axis by using a piezoelectric element to control the focus (see JP-A-2002-207168).

According to the projection lens unit disclosed in JP-A-2008-26864, the lens barrel has complicated structure and thus imposes optical design limitations. Particularly, incorporating a bimetal correcting mechanism in the small lens barrel is difficult.

Also, the projection side optical system shown in JP-A-2008-58654 is only a heat conductive lens barrel and thus cannot positively correct the change of the focus position caused by temperature changes.

The technology of JP-A-2004-264570 has complicated structure of the lens barrel, and the technology of JP-A-2002-207168 requires a special control circuit for the piezoelectric element.

SUMMARY

It is an advantage of some aspects of the invention to provide a projector capable of correcting the change of the focus position caused by temperature changes by a simple mechanism without complicating the structure of a lens barrel.

A projector according to an aspect of the invention includes: a display device which modulates illumination light; a projection lens which projects modulation light produced by the display device; and a holding device which has a holder member supporting the display device, a frame member supporting the projection lens and functions as a base capable of supporting the holder member, and an expanding and contracting member disposed between the frame member and the display device. A temperature coefficient for the expansion and contraction of the expanding and contracting member in the direction of the optical axis of the projection lens corresponds to a temperature coefficient for the increase and decrease of the focal distance of the projection lens. Incidentally, the phrase of "between the frame member and the display device" includes "interval between the display device and the holder member". Further, the linear expansion coefficient of the expanding and contracting member is preferably smaller than that of the frame member or the like.

According to this structure, the temperature coefficient for the expansion and contraction of the expanding and contracting member in the direction of the optical axis of the projection lens corresponds to the temperature coefficient for the increase and decrease of the focal distance of the projection lens. Thus, temperature compensation can be provided such that the increase and decrease of the focal distance of the projection lens caused by temperature changes is cancelled by the expansion and contraction of the expanding and contracting member, and the image formation condition or the image projection condition of the projection lens can be easily maintained even when the environmental temperature changes.

According to a specific aspect of the invention, the projector satisfies the following points. The expanding and contracting member is disposed between the holder member and the frame member. The temperature coefficient for the increase and decrease of the focal distance of the projection lens is a negative value. The temperature coefficient for the expansion and contraction of the expanding and contracting member is a positive value. The optical path downstream end of the expanding and contracting member is connected with a part of the holder member. The optical path upstream end of the expanding and contracting member is connected with a part of the frame member. According to this structure, the focal distance of the projection lens decreases as the temperature increases. However, the display device provided on the holder member approaches the projection lens by the length corresponding to the expansion of the expanding and contracting member caused by the temperature increase. Thus, the change of the focus position of the projection lens can be prevented.

According to another aspect of the invention, the frame member is fixed to a light guide as a light shielding support frame, and the holder member is supported by the frame member via the expanding and contracting member. In this case, the frame member supports not only the projection lens directly but also the display device indirectly via the holder member.

According to still another aspect of the invention, the expanding and contracting member is disposed on the frame member in such a manner as to be supported by the frame member, and the holder member is disposed on the expanding and contracting member in such a manner as to be supported by the expanding and contracting member. In this case, the expanding and contracting member is supported on the frame member, and the holder member is supported on the expanding and contracting member. Thus, the display device can be supported with sufficient movability and stability.

According to yet another aspect of the invention, the projector satisfies the following points. The expanding and contracting member is disposed between the holder member and the frame member. The temperature coefficient for the increase and decrease of the focal distance of the projection lens is a positive value. The temperature coefficient for the expansion and contraction of the expanding and contracting member is a positive value. The optical path downstream end of the expanding and contracting member is connected with a part of the frame member. The optical path upstream end of the expanding and contracting member is connected with a part of the holder member. According to this structure, the focal distance of the projection lens increases as the temperature increases. However, the display device provided on the holder member moves away from the projection lens by the length corresponding to the expansion of the expanding and contracting member caused by the temperature increase. Thus, the change of the focus position of the projection lens can be prevented.

According to still yet another aspect of the invention, the expanding and contracting member has a plurality of expanding and contracting element members, and the plural expanding and contracting element members are connected and laminated in series. In this case, large expansion and contraction can be secured by connection of the plural expanding and contracting element members in series. Moreover, the space for incorporating the expanding and contracting member can be reduced by lamination of the plural expanding and contracting element members.

According to further another aspect of the invention, the display device has a liquid crystal light valve for respective colors receiving illumination lights in the respective colors, and a color combining prism which combines the lights in the respective colors modulated by the liquid crystal light valve for the respective colors to form the modulation light. In this case, a high-luminance color image can be produced by combining the modulation lights formed by the liquid crystal light valve for the respective colors, and thus variations of the image formation condition such as out-of-focus condition of the projected color image can be reduced.

According to still further another aspect of the invention, the liquid crystal light valve for the respective colors is supported on a light entrance surface provided on the color combining prism, and the color combining prism is supported by the holder member. In this case, the support of the liquid crystal light valve can be easily stabilized.

According to yet further another aspect of the invention, the holder member has a base for supporting the color combining prism, and the expanding and contracting member is disposed between the color combining prism and the base. In this case, temperature compensation for the increase and decrease of the focal distance of the projection lens can be achieved by shifting the color combining prism supporting the liquid crystal light valve for the respective colors on the base.

According to still yet further aspect of the invention, the base has a fixing portion for positioning and fixing the expanding and contracting member, and a long hole having the longitudinal direction corresponding to the direction of the optical axis of the projection lens, and the expanding and contracting member has a fixed portion fixed to the fixing portion, and a pin-shaped movable member inserted into the long hole such that the movable member can slide in the direction of the optical axis. In this case, the color combining prism, i.e., the liquid crystal light valve for the respective colors can be positioned in accordance with the temperature by using the expanding and contracting member fixed to the fixing portion on the base and allowed to expand and contract in the longitudinal direction of the long hole.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
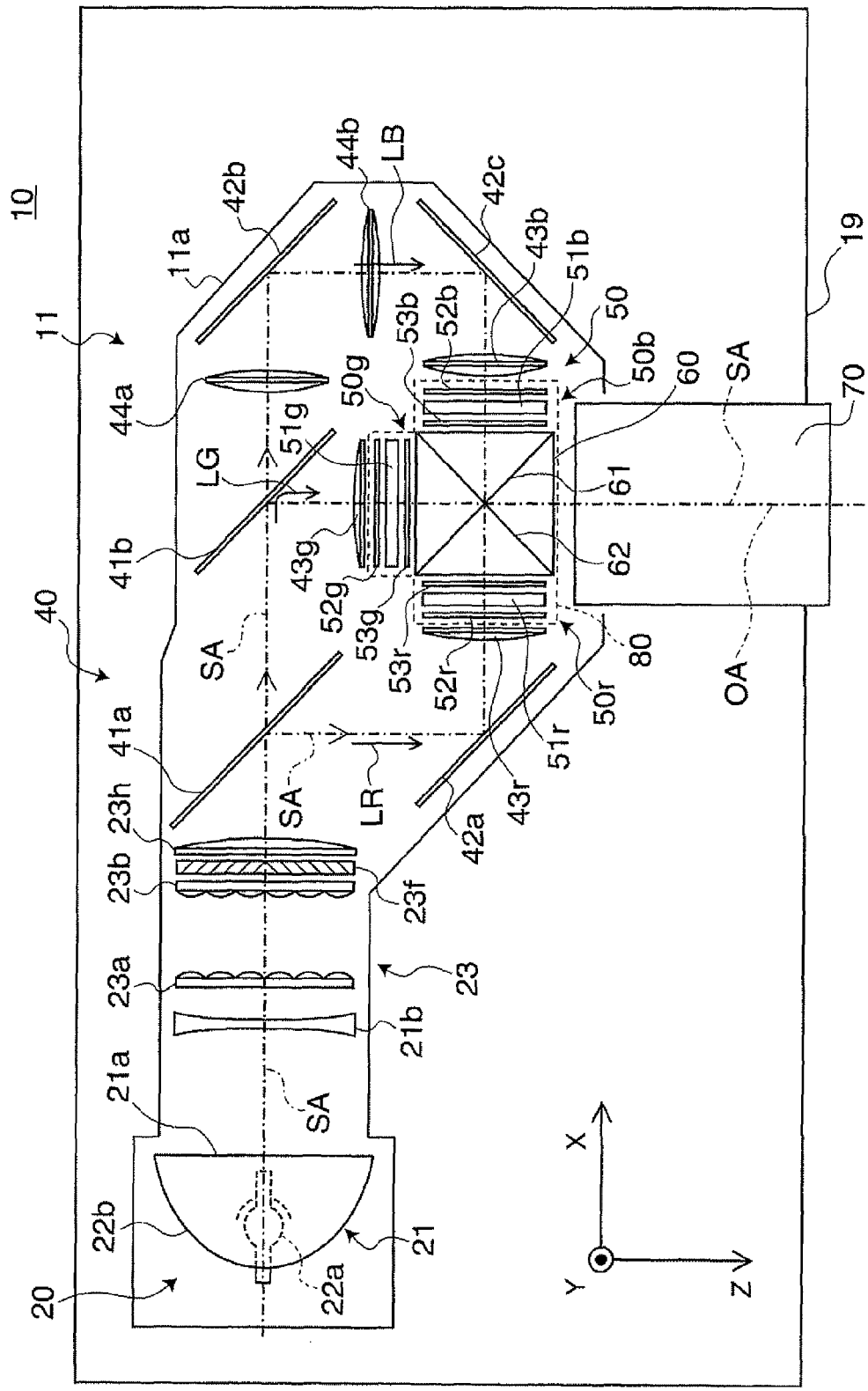
FIG. 1 illustrates optical systems included in a projector according to a first embodiment.

The structure and operation of a projector according to a first embodiment of the invention is hereinafter described with reference to FIG. 1 and other figures.

A projector 10 in this embodiment includes a main optical device 11 called optical engine unit as well, and an external case 19 covering the entire system of the projector 10. The main optical device 11 has an illumination device 20, a color separation light guide system 40, a light modulation unit 50, a cross dichroic prism 60, and a projection lens 70. The light modulation unit 50 and the cross dichroic prism 60 constitute a display device 80 for modulating illumination light and forming an image. Almost all parts of the illumination device 20, the color separation light guide system 40, the light modulation unit 50, the cross dichroic prism 60, and the projection lens 70 are accommodated in a light guide 11a as a light shielding support frame, and are optically aligned and fixed within the light guide 11a.

The illumination device 20 includes a light source lamp unit 21 and an equalizing system 23. The light source lamp unit 21 has a lamp unit 21a and a concave lens 21b as a light source. The lamp unit 21a has a lamp main body 22a such as a high-pressure mercury lamp, and a concave mirror 22b for collecting light emitted from the light source and directing the light toward the front. The concave lens 21b has a function of converting the light emitted from the lamp unit 21a into light substantially parallel with a system optical axis SA, i.e., an illumination axis. However, when the concave mirror 22b is a parabolic mirror, for example, the concave lens 21b can be eliminated. The equalizing system 23 disposed after the light source lamp unit 21 has first and second lens arrays 23a and 23b, a polarization converting member 23f, and a stacking lens 23h. Each of the first and second lens arrays 23a and 23b has a plurality of element lenses disposed in matrix. The element lenses contained in the first lens array 23a divide the light emitted from the light source lamp unit 21 into plural partial lights. The element lenses contained in the second lens array 23b receive the partial lights from the first lens array 23a and release the partial lights at appropriate divergence angles. The polarization converting member 23f constituted by a PBS prism array, a wavelength plate or the like converts the lights received from the lens array 23b into only linear polarized lights in a particular direction, and supplies the converted lights to the subsequent optical system. The stacking lens 23h generally and appropriately converges the illumination lights having passed the polarization converting member 23f to stack the converged lights on each of liquid crystal light valves 50r, 50g, and 50b for respective colors provided on the light modulation unit 50. Thus, the illumination lights emitted from the illumination device 20 can be uniformly applied to the displayable areas of the liquid crystal light valves 50r, 50g, and 50b for the respective colors via the color separation light guide system 40 as will be described later.

The color separation light guide system 40 has first and second dichroic mirrors 41a and 41b, reflection mirrors 42a, 42b, and 42c, and three field lenses 43r, 43g, and 43b to separate the illumination light emitted from the illumination device 20 into red (R) light, green (G) light, and blue (B) light, and guide the respective color lights to the subsequent liquid crystal light valves 50r, 50g, and 50b. More specifically, the first dichroic mirror 41a initially reflects an illumination light LR in R color contained in the three color lights in R, G, and B colors, and transmits illumination lights LG and LB in G and B colors. The second dichroic mirror 41b reflects the illumination light LG contained in the two color lights in G and B colors, and transmits the illumination light LB. The illumination light LR reflected by the first dichroic mirror 41a in the color separation light guide system 40 travels through an R optical path as one of two branched paths at the first dichroic mirror 41a almost along the system optical axis SA to enter the field lens 43r provided for incident angle control via the reflection mirror 42a. The illumination light LG transmitted by the first dichroic mirror 41a and reflected by the second dichroic mirror 41b travels through a G optical path as one of two branched paths at the second dichroic mirror 41b almost along the system optical axis SA to enter the field lens 43g provided for incident angle control. The illumination light LB having passed the second dichroic mirror 41b travels through a B optical path as the other branched path at the second dichroic mirror 41b almost along the system optical axis SA to pass through relay lenses 44a and 44h and the reflection mirrors 42b and 42c and enter the field lens 43b provided for incident angle control.

Each of the liquid crystal light valves 50r, 50g, and 50b as a non light emission type light modulation device included in the light modulation unit 50 individually modulates the spatial intensity distribution of the entering illumination light. The liquid crystal light valves 50r, 50g, and 50b have liquid crystal panels 51r, 51g, and 51b receiving the corresponding color lights LR, LG, and LB from the color separation light guide system 40, entrance side polarization filters 52r, 52g, and 52b disposed on the entrance sides of the liquid crystal panels 51r, 51g, and 51b, and exit side polarization filters 53r, 53g, and 53b disposed on the exit sides of the liquid crystal panels 51r, 51g, and 51b. Each of the liquid crystal panels 51r, 51g, and 51b varies the spatial distribution in the polarization direction contained in the corresponding light of the color lights LR, LG, and LB received through the entrance side polarization filters 52r, 52g, and 52b. More specifically, the respective polarization conditions of the color lights LR, LG, and LB having entered the liquid crystal panels 51r, 51g, and 51b are controlled by pixel according to drive signals or control signals inputted to the liquid crystal panels 51r, 51g, and 51b as electric signals, and the spatial intensities of the color lights LR, LG, and LB are modulated by pixel while the color lights LR, LG, and LB are passing through the exit side polarization filters 53r, 53g, and 53b.

The cross dichroic prism 60 is a color combining prism or a light combining system for synthesizing a color image. The cross dichroic prism 60 contains a first dichroic film 61 as a dielectric multilayer film for reflecting R light, and a second dichroic film 62 as a dielectric multilayer film for reflecting B light, both of which films 61 and 62 are disposed in an X shape in the plan view. The cross dichroic prism 60 reflects the red light LR received from the liquid crystal light valve 50r disposed perpendicularly to the system optical axis SA on the R optical path by the function of the first dichroic film 61 such that the light LR can be bent to the right with respect to the traveling direction. The cross dichroic prism 60 directs the green light LG received from the liquid crystal light valve 50g disposed perpendicularly to the system optical axis SA on the G optical path such that the green light LG can travel straight without bending by using both the dichroic films 61 and 62. The cross dichroic prism 60 reflects the blue light LB received from the liquid crystal light valve 50b disposed perpendicularly to the system optical axis SA on the B optical path by the function of the second dichroic film 62 such that the light LB can be bent to the left with respect to the traveling direction.

The projection lens 70 is a specific example of a projection system which expands image light formed by the light combined by the cross dichroic prism 60 at a desired expansion rate, and projects a still color image or dynamic color image on a screen described later.

Figure 2:
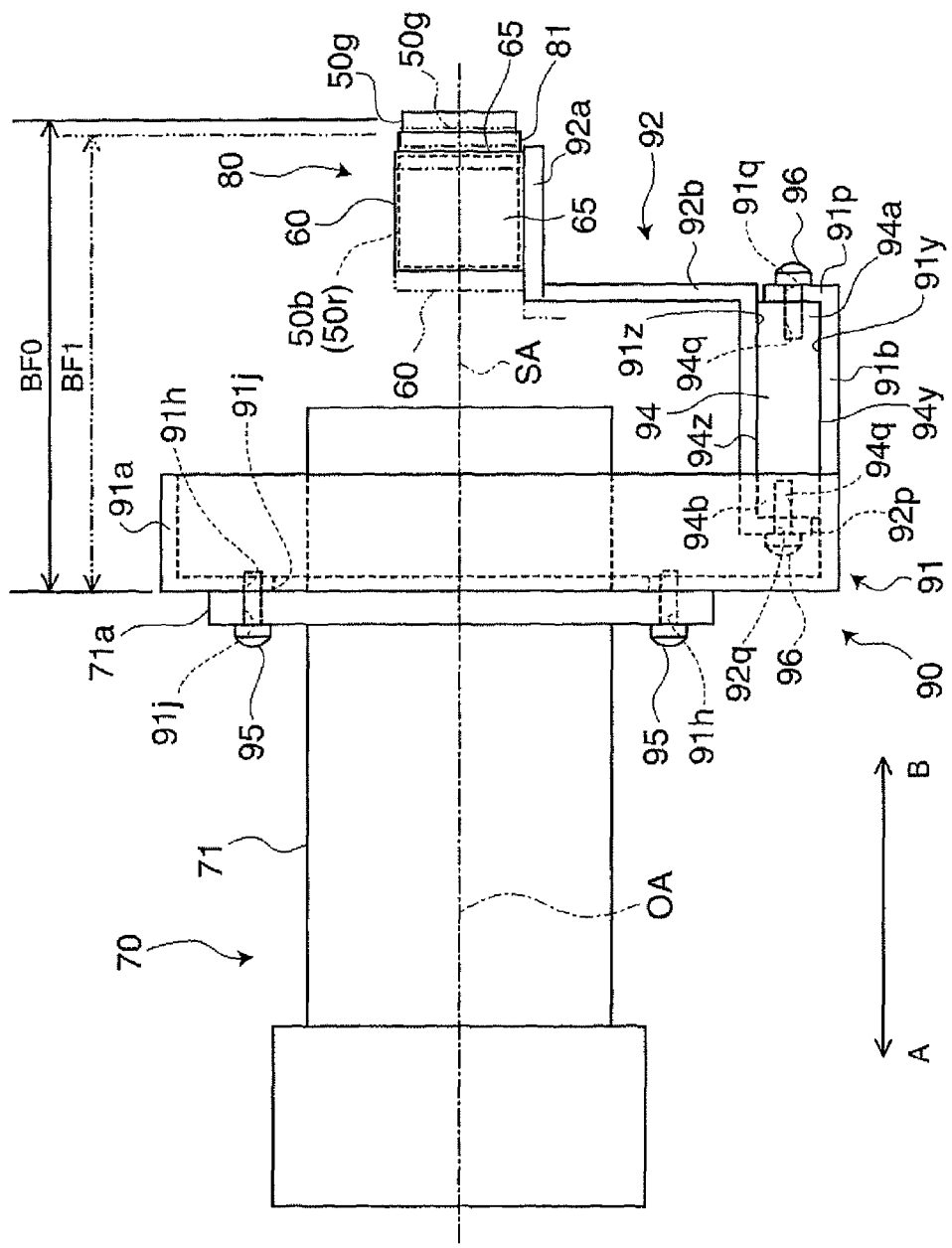
FIG. 2 is a side view illustrating a main part of the projector and the condition of the part during use.
Figure 3:
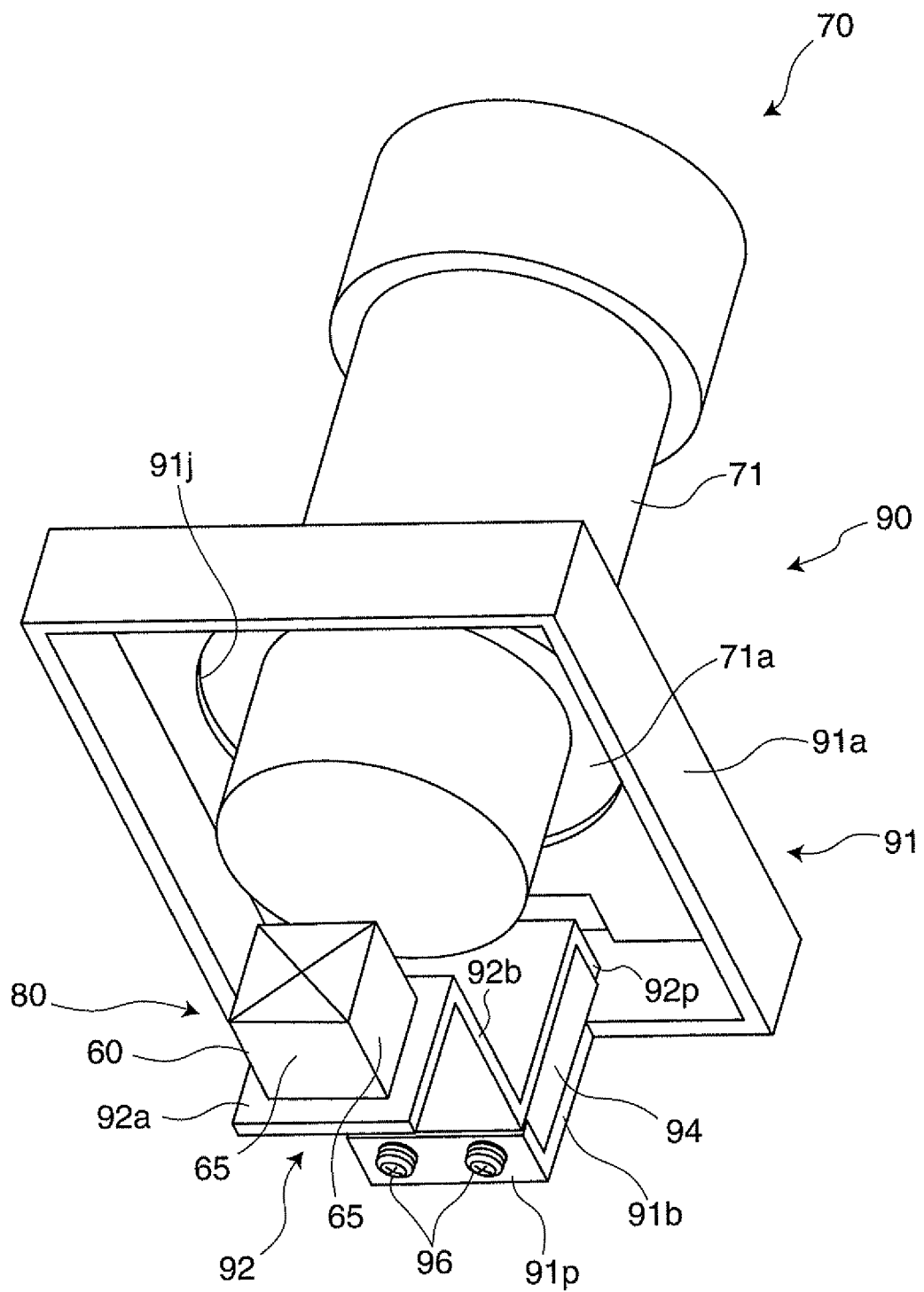
FIG. 3 is a perspective view illustrating the main part of the projector and the condition of the part during use.

FIG. 2 is a side view illustrating a method for fixing the display device 80 and the projection lens 70. FIG. 3 is a perspective view corresponding to FIG. 2.

A holding device 90 for fixing the display device 80 and the projection lens 70 includes a frame member 91 as a base for supporting the projection lens 70, a holder member 92 for supporting the display device 80, and an expanding and contracting member 94 interposed between the holder member 92 and the frame member 91. The frame member 91 of the holding device 90 is fixed to the light guide 11a for accommodating the main optical device 11 shown in FIG. 1.

The frame member 91 has a lens barrel support portion 91a for supporting a fixing flange 71a provided on the outer circumference of a lens barrel 71 of the projection lens 70, and a support projection portion 91b extending from the lower end of the lens barrel support portion 91a to the upstream side of the optical path. In this case, the lens barrel support portion 91a corresponds to a main body part fixed to the light guide 11a shown in FIG. 1. The lens barrel support portion 91a has fixing screw holes 91h. The fixing flange 71a of the projection lens 70 is fixed to the lens barrel support portion 91a by inserting the lens barrel 71 of the projection lens 70 into an opening 91j of the lens barrel support portion 91a and then threading fixing screws 95 into the screw holes 91h via openings 71j of the fixing flange 71a. By this method, the projection lens 70 can be aligned with the frame member 91. That is, the projection lens 70 can be securely fixed to the main optical device 11 of the system main body via the frame member 91. Thus, the projection lens 70 can be securely supported with sufficient stability.

The holder member 92 has a base 92a for supporting the cross dichroic prism 60, and a support base 92b for supporting the base 92a at an upper position of the frame member 91. The bottom surface of the cross dichroic prism 60 is fixed to the upper surface of the base 92a by an adhesive or the like. The liquid crystal light valves 50r, 50g, and 50b for the respective color lights are fixed to three light entrance surfaces 65 as the side surfaces of the cross dichroic prism 60 via support members 81 for alignment. The support base 92b is mounted on the expanding and contracting member 94 as will be described later, and is slightly movable in a direction parallel with the system optical axis SA, i.e., an optical axis OA of the projection lens 70 in accordance with the expansion and contraction of the expanding and contracting member 94.

The expanding and contracting member 94 is disposed between the frame member 91 and the holder member 92. More specifically, the expanding and contracting member 94 is mounted on the frame member 91 in such a manner as to be supported by the frame member 91, and the holder member 92 is mounted on the expanding and contracting member 94 in such a manner as to be supported by the expanding and contracting member 94. An optical path upstream end 94a of the expanding and contracting member 94 is connected with a part of the frame member 91, and an optical path downstream end 94b of the expanding and contracting member 94 is connected with a part of the holder member 92. More specifically, the end 94a of the expanding and contracting member 94 is fixed to an engaging plate 91p rising from an optical path upstream end of the support projection portion 91b of the frame member 91 and extending in the direction perpendicular to the optical axis OA by using fixing screws 96. That is, the end 94a of the expanding and contracting member 94 can be aligned with and fixed to the engaging plate 91p of the frame member 91 by threading the fixing screws 96 into screw holes 94q formed at the end of the expanding and contracting member 94 via openings 91q of the engaging plate 91p. Similarly, the end 94b of the expanding and contracting member 94 is fixed to an engaging plate 92p rising from an optical path downstream end of the support base 92b of the holder member 92 and extending in the direction perpendicular to the optical axis OA by using the fixing screws 96. That is, the engaging plate 92p of the holder member 92 can be aligned with and fixed to the end 94b of the expanding and contracting member 94 by threading the fixing screws 96 into the screw holes 94q formed at the end of the expanding and contracting member 94 via openings 92q of the engaging plate 92p.

Accordingly, the end 94b of the expanding and contracting member 94 is freed from the frame member 91, and the end 94a of the expanding and contracting member 94 is freed from the holder member 92. A lower surface 94y of the expanding and contracting member 94 can slide on an upper surface 91y of the lens barrel support portion 91a, and an upper surface 94z of the expanding and contracting member 94 can slide on a lower surface 92z of the support base 92b. Thus, the expanding and contracting member 94 can expand and contract on the lens barrel support portion 91a, and smoothly shift the holder member 92, i.e., the display device 80 with respect to the projection lens 70 in a direction AB or BA parallel with the optical axis OA of the projection lens 70 in accordance with the expansion and contraction of the expanding and contracting member 94.

The function of the expanding and contracting member 94 is now explained. It is assumed that the projection lens 70 has such temperature characteristics that the focus position slightly changes in accordance with temperature changes. As illustrated in FIG. 2, a back focus length BF0 of the projection lens 70 at room temperature corresponds to the positions of the liquid crystal light valve 50r and the like as indicated by a solid line. In this condition, an image on the not-shown screen is in focus. When the projection lens 70 is heated during image projection, the back focus length BF0 of the projection lens 70 corresponding to the positions of the liquid crystal light valve 50r and the like as shown by the solid line changes to a back focus length BF1 corresponding to the positions of the liquid crystal light valve 50r and the like shifted to the optical path downstream side as indicated by a two-dot chain line. More specifically, a temperature coefficient $\alpha$ for the increase and decrease of the focal distance of the projection lens 70 is a negative value, and the focal distance decreases as the temperature rises. On the other hand, the expanding and contracting member 94 has such temperature characteristics as to expand and contract in accordance with temperature changes. When the expanding and contracting member 94 is heated during image projection, the length of the expanding and contracting member 94 in the direction of the optical axis OA increases. More specifically, a temperature coefficient $\beta$ for the expansion and contraction of the expanding and contracting member 94 in the direction of the optical axis OA is a positive value, and the expanding and contracting member 94 expands by temperature increase and shifts the holder member 92 to the optical path downstream side, i.e., in the BA direction. Accordingly, the back focus length BF1 slightly decreases by the temperature increase of the projection lens 70, but the liquid crystal light valve 50r and the like disposed on the holder member 92 slightly approaches the projection lens 70 by the expansion of the expanding and contracting member 94. When the temperature coefficient $\alpha$ for the increase and decrease of the focal distance of the projection lens 70 is substantially equal to the temperature coefficient $\beta$ for the expansion and contraction of the expanding and contracting member 94 in the direction of the optical axis OA, the liquid crystal light valve 50r and the like can be shifted in accordance with the focus difference BF1−BF0 corresponding to the change of the back focus length. Thus, the focus position does not change even when the temperature varies. Accordingly, the focus condition of the projection image can be kept constant by the function of the holding device 90 having a simple control mechanism without requiring an auto focus mechanism.

The expanding and contracting member 94 is made of polyoxymethylene (POM) as polyacetal resin, for example. The linear expansion coefficient of the polyoxymethylene is $1.0 \times 10^{-4} [1/°C.]$. When the length of the expanding and contracting member 94 in the direction of the optical axis OA is 10 mm, for example, the temperature coefficient $\beta$ for the expansion and contraction is $1.0 \times 10^{-3} [mm/°C.]$. Thus, when the environmental temperature rises by 20° C., the expanding and contracting member 94 expands by 0.02 mm (20 µm). On the other hand, the temperature coefficient $\alpha$ for the focus difference BF1−BF0 of the projection lens 70 in this embodiment is $-1.0 \times 10^{-3} [mm/°C.]$, for example. Thus, when the temperature around the projection lens 70 increases from the room temperature by 20° C., the back focus length BF0 of the projection lens 70 decreases by 20 µm, for example. However, the liquid crystal light valve 50r and the like approach the projection lens 70 by 20 µm by the expansion of the expanding and contracting member 94, and thus the liquid crystal light valve 50r and the like can be maintained at the back focus position of the projection lens 70.

The material of the expanding and contracting member 94 is not limited to polyacetal resin but may be other materials. For example, polyethylene (linear expansion coefficient: $1.1 \times 10^{-4} [1/°C.]$), polypropylene (linear expansion coefficient: $1.1 \times 10^{-4} [1/°C.]$) and the like have relatively large linear expansion coefficients for the material of the expanding and contracting member 94, and thus are preferable for canceling the focus difference BF1−BF0 of the projection lens 70.

It is assumed in the explanation herein that the linear expansion coefficients of the frame member 91 and the holder member 92 are small compared with those of the expanding and contracting member 94 and the like and thus produce only ignorable expansion and contraction of both the members 91 and 92. The frame member 91 and the holder member 92 are made of aluminum die casting (linear expansion coefficient:

$2.1 \times 10^{-5}$[1/° C.]), magnesium die casting (linear expansion coefficient: $2.72 \times 10^{-5}$[1/° C.]), zinc die casting (linear expansion coefficient: $2.7 \times 10^{-5}$[1/° C.]), or other material having low linear expansion coefficient, for example. When the linear expansion coefficients of the frame member 91 and the holder member 92 are relatively large, it is preferable that the change of the focal distance of the projection lens 70 is corrected considering not only the expansion and contraction of the expanding and contracting member 94 but also those of both the members 91 and 92.

It is assumed in the explanation herein that the temperature difference between the projection lens 70 and the expanding and contracting member 94 is small and ignorable. However, when the heat conductivities of the frame member 91, the holder member 92 and the like are small, the temperature difference between the projection lens 70 and the expanding and contracting member 94 increases in some cases. In this case, the linear expansion coefficient and the length of the expanding and contracting member 94 may be set at such values as to correct the temperature difference between the projection lens 70 and the expanding and contracting member 94 as offset prior to the focus compensation based on the estimation of the temperature difference between the projection lens 70 and the expanding and contracting member 94.

According to the projector 10 described in this embodiment, the temperature coefficient $\beta$ for the expansion and contraction of the expanding and contracting member 94 in the direction of the optical axis OA of the projection lens 70 corresponds to the temperature coefficient $\alpha$ for the increase and decrease of the focal distance of the projection lens 70. Accordingly, temperature compensation can be provided such that the increase and decrease of the focal distance of the projection lens 70 caused by temperature changes is cancelled by the expansion and contraction of the expanding and contracting member 94, and thus the image projection condition of the projection lens 70 can be easily maintained even when the environmental temperature changes.

Second Embodiment

A projector according to a second embodiment of the invention is now described. The projector in the second embodiment is a modification of the projector in the first embodiment, and thus the parts not particularly referred to in this embodiment are similar to the corresponding parts of the projector in the first embodiment.

Figure 4:
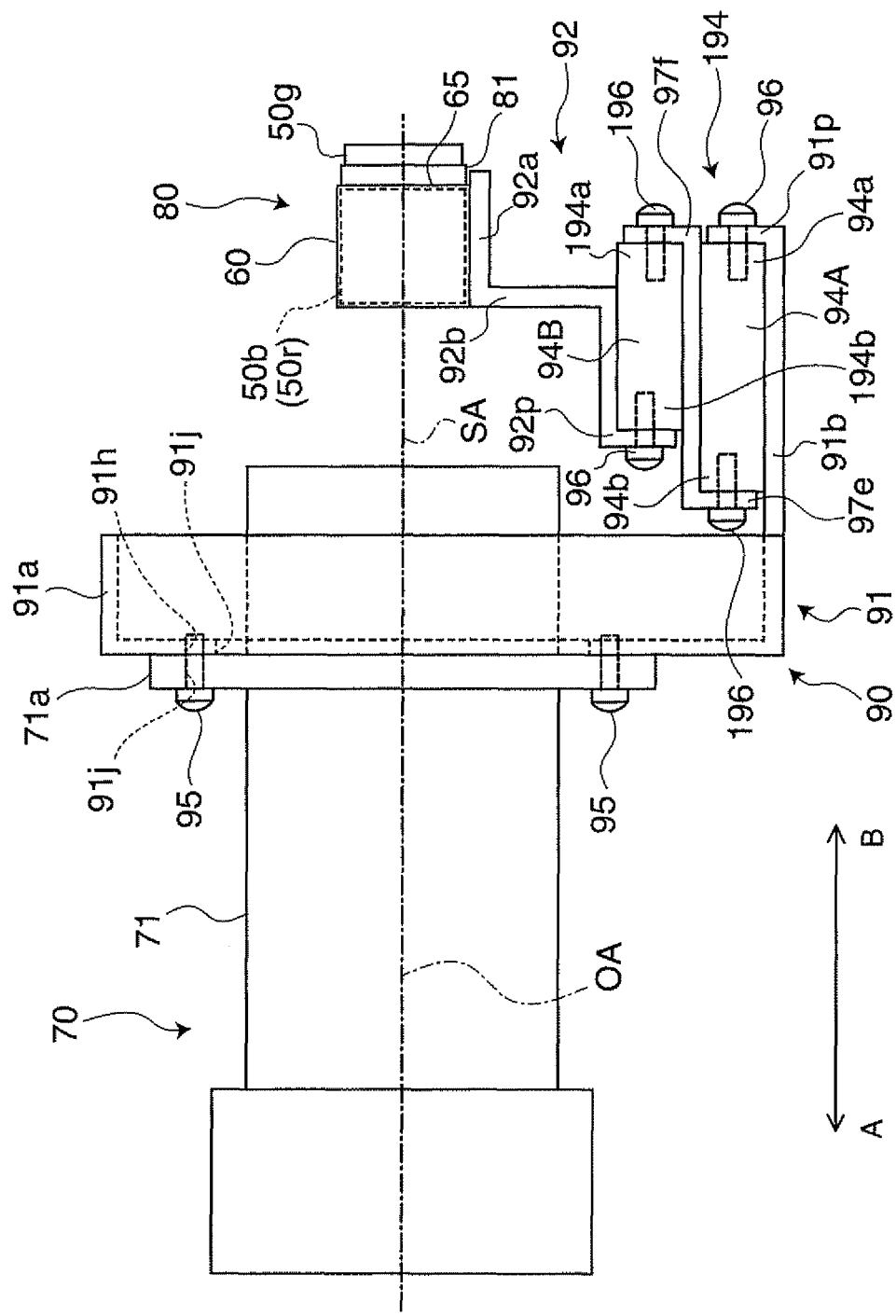
FIG. 4 is a side view illustrating a main part and the condition of the part during use according to a second embodiment.
Figure 5:
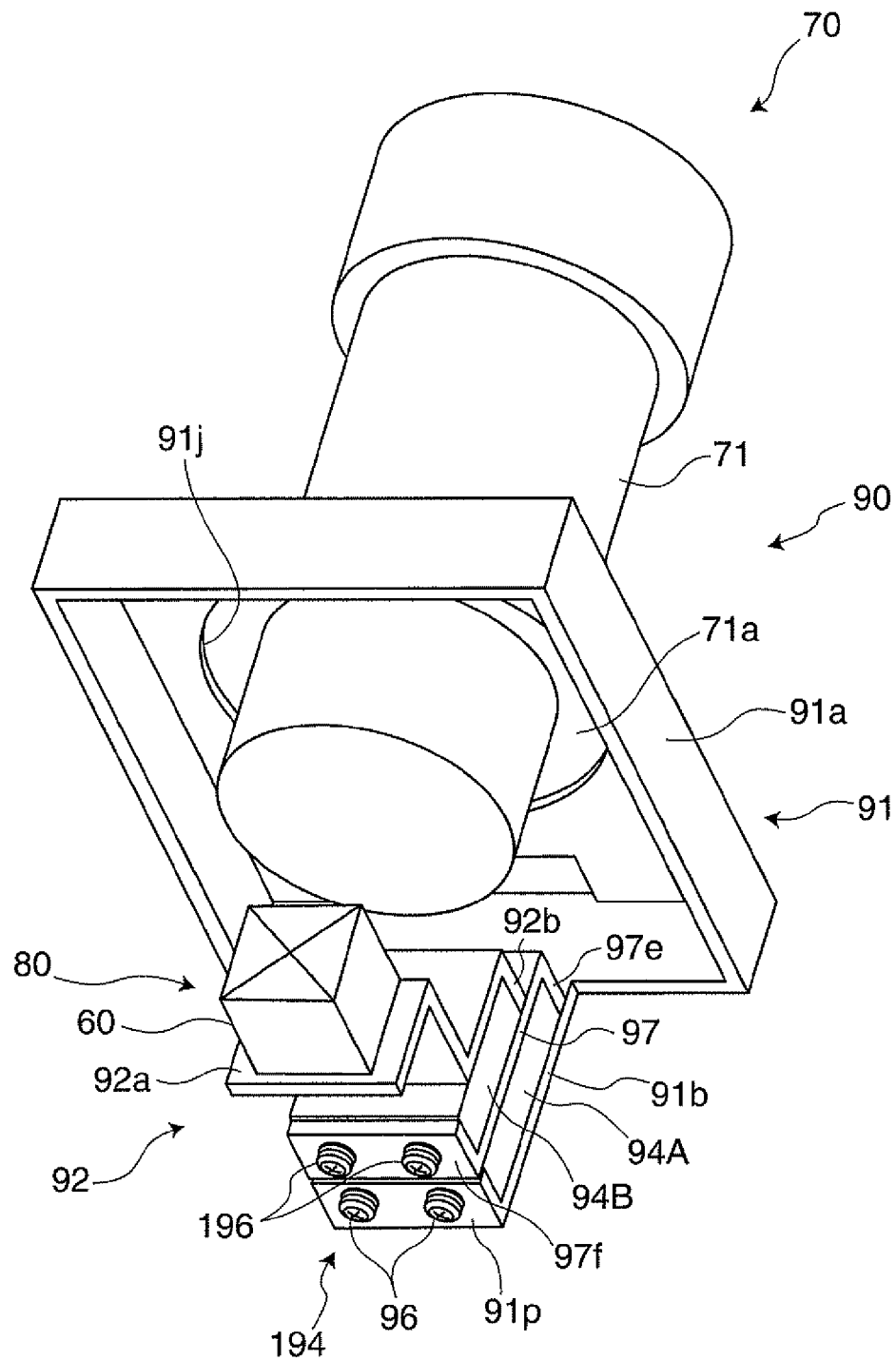
FIG. 5 is a perspective view illustrating the main part and the condition of the part during use according to the second embodiment.

As illustrated in FIGS. 4 and 5, the projector 10 in this embodiment includes the holding device 90 as a unit interposed between the frame member 91 and the holder member 92 and containing a multistage expanding and contracting member 194. The expanding and contracting member 194 has a first expanding and contracting element member 94A, a second expanding and contracting element member 94B, and a coupling member 97. The first expanding and contracting element member 94A and the second expanding and contracting element member 94B are connected and laminated in series via the coupling member 97. The expanding and contracting element members 94A and 94B are made of the same material as that of the expanding and contracting member 94 shown in FIG. 2 and other figures, and expand and contract in accordance with temperature changes.

The optical path upstream end 94a of the first expanding and contracting element member 94A is connected with the engaging plate 91p rising from the optical path upstream end of the support projection portion 91b of the frame member 91 by the fixing screws 96. The optical path downstream end 94b of the first expanding and contracting element member 94A is connected with an engaging plate 97e rising from the optical path downstream end of the coupling member 97 by fixing screws 196. An optical path upstream end 194a of the second expanding and contracting element member 94B is connected with an engaging plate 97f rising from the optical path upstream end of the coupling member 97 by the fixing screws 196. An optical path downstream end 194b of the second expanding and contracting element member 94B is connected with the engaging plate 92p rising from the optical path downstream end of the support base 92b of the holder member 92 by fixing screws 96.

The expanding and contracting member 194 having this structure connects the first and second expanding and contracting element members 94A and 94B in series by the coupling member 97. In this case, the temperature coefficient $\beta$ corresponds to the sum of the lengths of the expanding and contracting element members 94A and 94B in the direction of the optical axis OA, and thus the expansion and contraction of the expanding and contracting member 194 increases. Furthermore, the expanding and contracting member 194 is a lamination of the two components of the first and second expanding and contracting element members 94A and 94B overlapping with each other. Accordingly, the length of the expanding and contracting member 194 in the direction of the optical axis OA is reduced, and thus space saving for the expanding and contracting member 194 is achieved.

Third Embodiment

A projector according to a third embodiment of the invention is now described. The projector in the third embodiment is a modification of the projector in the first embodiment, and thus the parts not particularly referred to in this embodiment are similar to the corresponding parts of the projector in the first embodiment.

Figure 6:
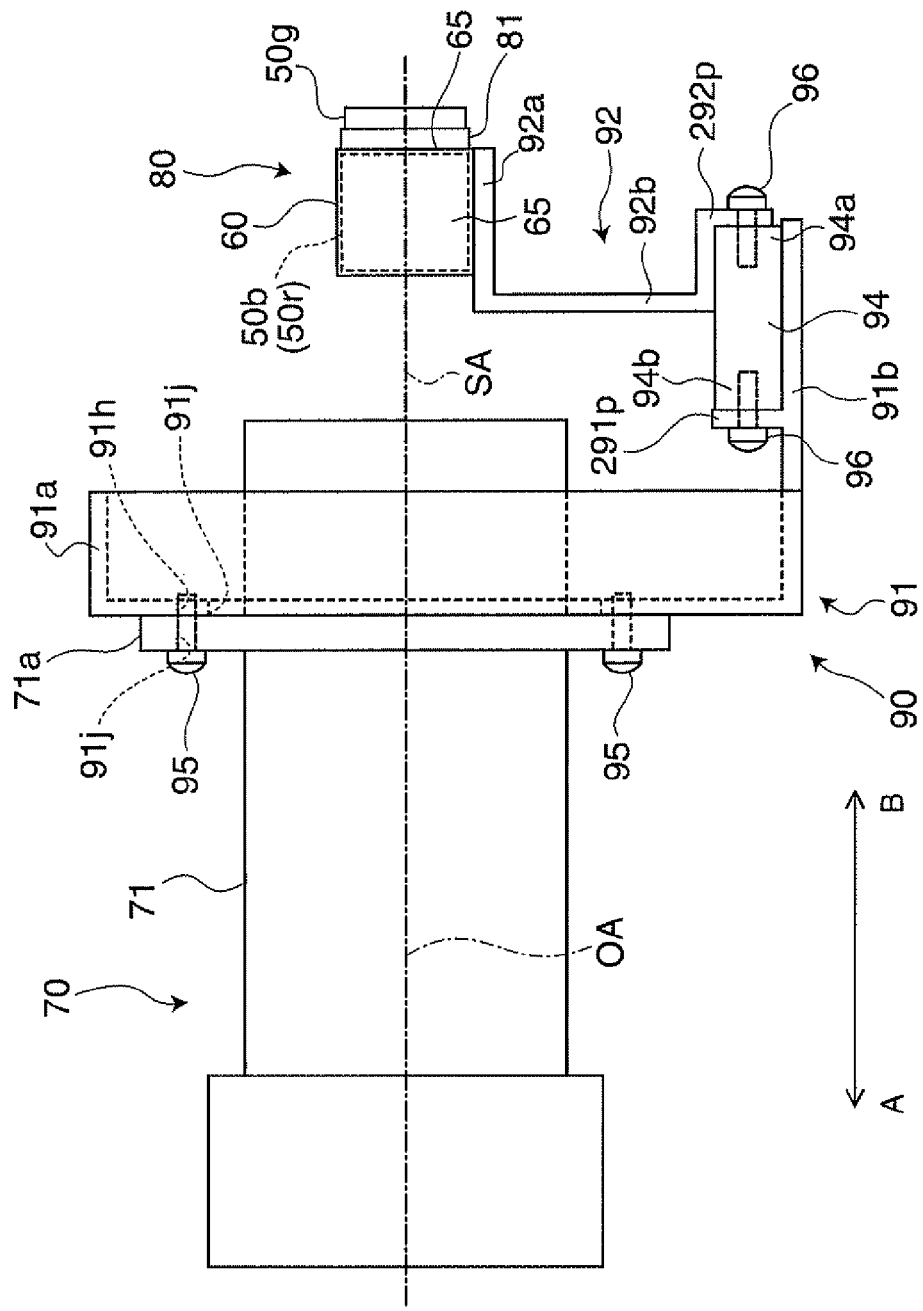
FIG. 6 is a side view illustrating a main part and the condition of the part during use according to a third embodiment.

According to the projector 10 in this embodiment, the temperature coefficient $\alpha$ for the increase and decrease of the focal distance of the projection lens 70 is a positive value as illustrated in FIG. 6. Thus, the assembly method of an expanding and contracting member 294 is different.

According to this structure, the optical path upstream end 94a of the expanding and contracting member 94 is connected with an engaging plate 292p provided on the support base 92b of the holder member 92 by the fixing screws 96, and the optical path downstream end 94b of the expanding and contracting member 94 is connected with the engaging plate 92p provided on the support projection portion 91b of the frame member 91 by the fixing screws 196. In this case, the back focus position shifts to the optical path upstream side by the temperature increase of the projection lens 70, and the liquid crystal light valve 50r and the like provided on the holder member 92 move in a direction away from the projection lens 70 by the expansion of the expanding and contracting member 94. Accordingly, the liquid crystal light valve 50r and the like can be shifted in correspondence with the back focus position of the projection lens 70, and therefore the change of the focus position can be prevented even when the temperature varies.

Fourth Embodiment

A projector according to a fourth embodiment of the invention is now described. The projector in the fourth embodiment is a modification of the projector in the first embodiment, and thus the parts not particularly referred to in this embodiment are similar to the corresponding parts of the projector in the first embodiment.

Figure 7:
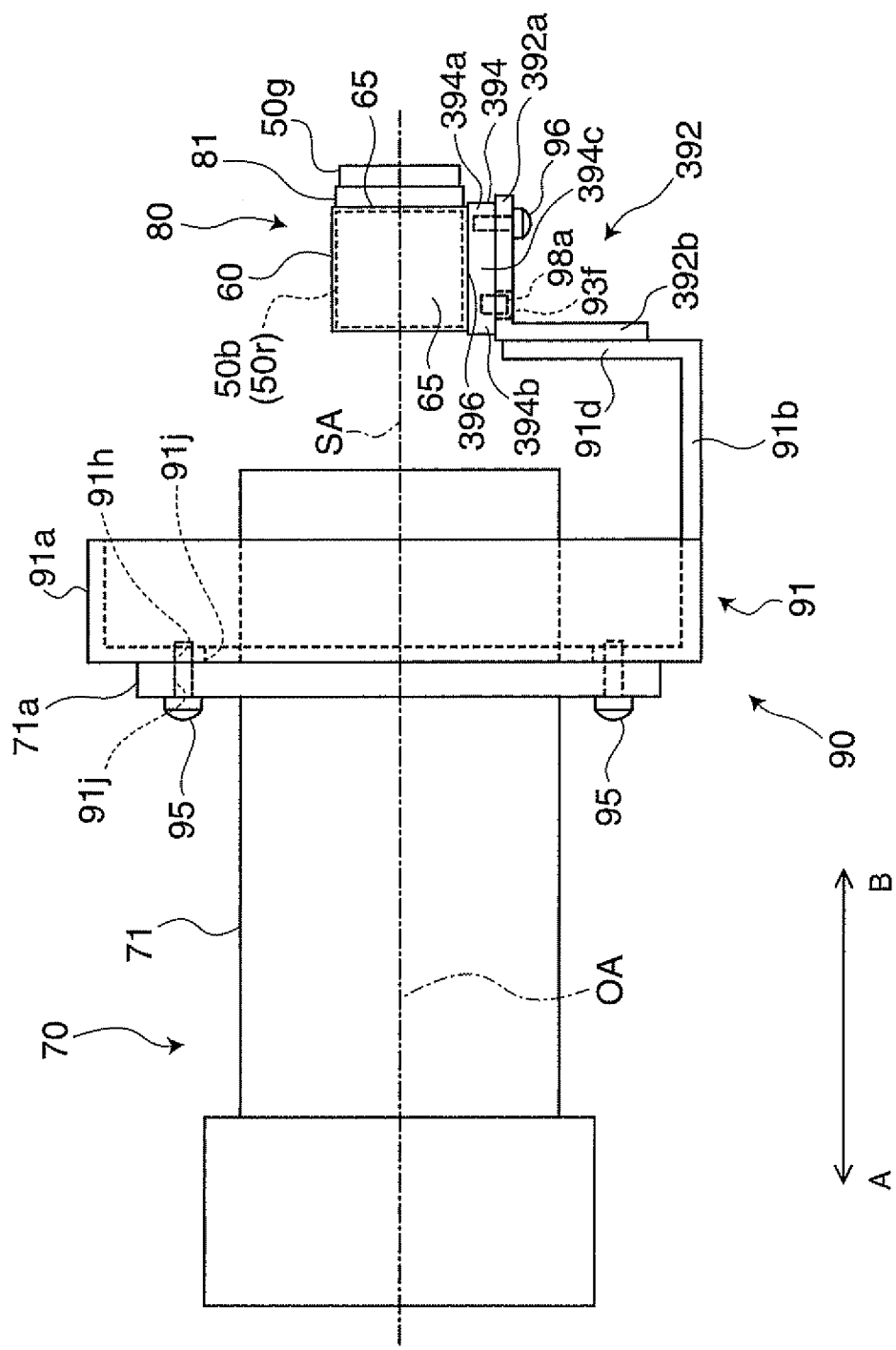
FIG. 7 is a side view illustrating a main part and the condition of the part during use according to a fourth embodiment.

According to the projector 10 in this embodiment, a holder member 392 is fixed to a support member 91d rising from the rear end of the frame member 91 as illustrated in FIG. 7. The holder member 392 has a base 392a for supporting the cross dichroic prism 60 as the color combining prism, and an attachment 392b for supporting the base 392a and fixing the base 392a to the frame member 91. In this structure, the expanding and contracting member 394 is interposed between the dichroic prism 60 and the base 392a. The expanding and contracting member 394 is a plate-shaped component fixed to the base 392a as the support stand by the fixing screw 96, and further fixed to the cross dichroic prism 60 by an adhesive 396.

Figure 8:
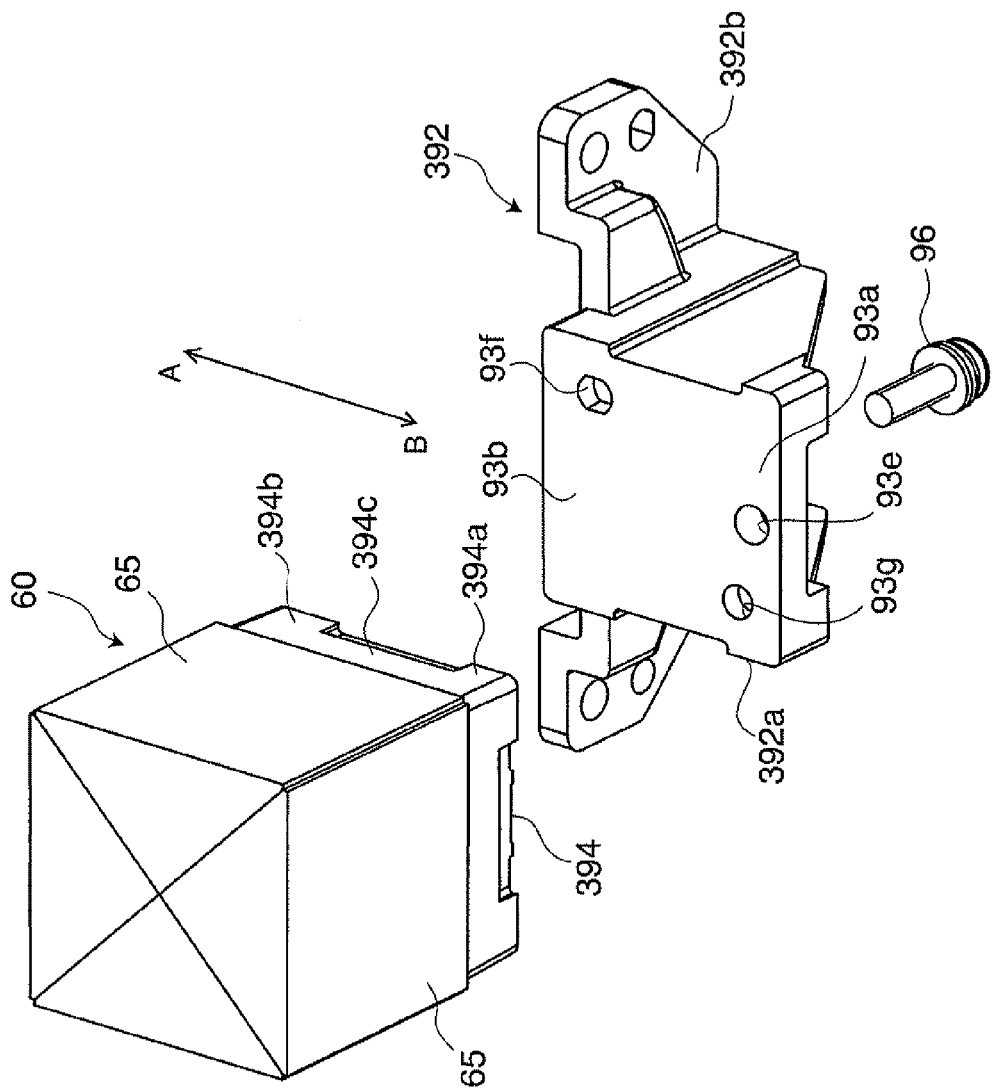
FIG. 8 is a perspective view of a holder member and other parts.
Figure 9A:
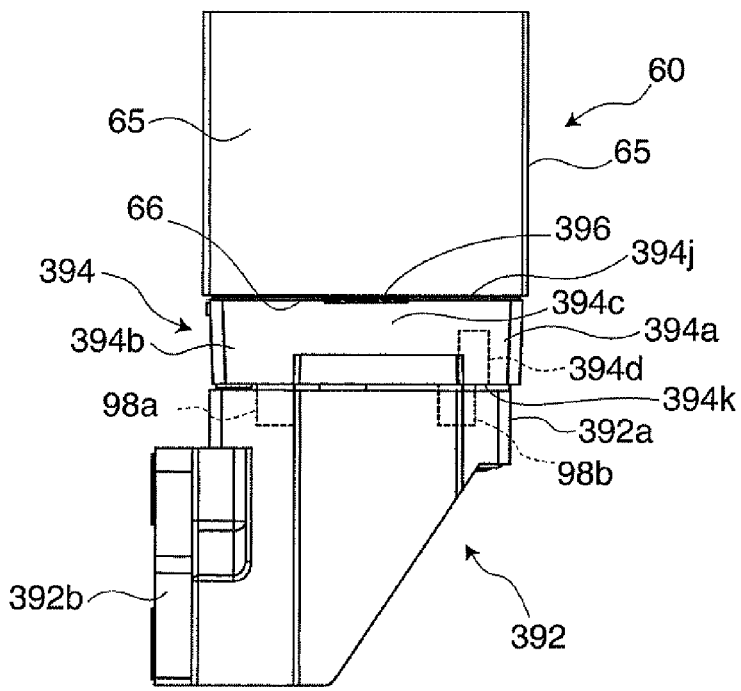
FIG. 9A is a side view of the holder member and other parts.
Figure 9B:
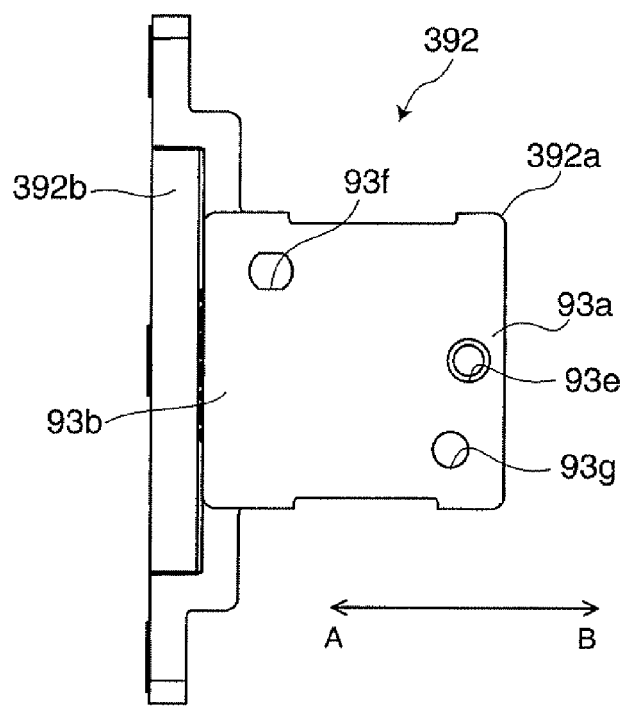
FIG. 9B is a plan view of the holder member.

FIG. 8 is a perspective view of the holder member 392 and others. FIG. 9A is a side view of the holder member 392 and others, and FIG. 9B is a plan view of the holder member 392. The base 392a for supporting the cross dichroic prism 60 has a flat upper surface, and has a first fixing round hole 93e, a guiding long hole 93f, and a second positioning round hole 93g. The first and second round holes 93e and 93g are formed at an optical path upstream end 93a of the base 392a as the support stand, and the long hole 93f is formed at an optical path downstream end 93b of the base 392a as the support stand. The fixing screw 96 is inserted into the first round hole 93e such that the tip of the fixing screw 96 can be threaded into a screw hole 394d of the expanding and contracting member 394 (see FIG. 9A). By this method, the expanding and contracting member 394 is fixed to the upper surface of the base 392a. Thus, the first round hole 93e functions as a portion for fixing the expanding and contracting member 394, and the screw hole 394d functions as a fixed portion of the expanding and contracting member 394. A sliding pin 98a as a movable member screwed to the rear side of the expanding and contracting member 394 and fixed thereto (see FIG. 9A) is inserted into the long hole 93f such that the sliding pin 98a can slide within the long hole 93f. In this structure, the sliding pin 98a as the movable member can be guided in the AB direction or BA direction corresponding to the expanding direction of the long hole 93f. Thus, the expanding and contracting member 394 can expand and contract in the direction of the optical axis OA of the projection lens 70, and also the positional shift of the expanding and contracting member 394 such as rotation can be prevented. A fixing pin 98b screwed to the rear side of the expanding and contracting member 394 and fixed thereto (see FIG. 9A) engages with the second round hole 93g. By this engagement, the positional shift of the expanding and contracting member 394 such as slight rotation can be securely prevented.

As illustrated in FIG. 9A and other figures, an upper surface 394j of the expanding and contracting member 394 supports a lower surface 66 of the cross dichroic prism 60, and a lower surface 394k of the expanding and contracting member 394 is supported by the flat upper surface of the base 392a. As explained above, an optical path upstream end 394a of the expanding and contracting member 394 is fixed to the base 392a of the holder member 392 by the fixing screw 96. An optical path downstream end 394b of the expanding and contracting member 394 is guided by the long hole 93f but not fixed thereto such that the end 394b can be shifted in accordance with expansion and contraction. The upper surface of a central portion 394c of the expanding and contracting member 394 is fixed to the lower surface 66 of the cross dichroic prism 60 by the adhesive 396. Thus, the cross dichroic prism 60 moves in the AB direction or BA direction in accordance with the expansion or contraction of the expanding and contracting member 394 in the AB direction or BA direction.

According to this embodiment, the back focus position shifts to the optical path downstream side by the temperature increase of the projection lens 70. The expanding and contracting member 394 also expands in the direction of the optical axis OA of the projection lens 70 parallel with the AB direction. Thus, the liquid crystal light valve 50r and the like provided on the cross dichroic prism 60 can be shifted in such a direction as to approach the projection lens 70. That is, the liquid crystal light valve 50r and the like can be moved in accordance with the back focus position of the projection lens 70, and thus the change of the focus position can be prevented even when the temperature varies.

In the fourth embodiment, it is possible to fix the optical path downstream end 394b of the expanding and contracting member 394 to the base 392a of the holder member 392, and allow the shift of the optical path upstream end 394a of the expanding and contracting member 394 in the direction of the optical axis OA without fixing the end 394a.

The invention is not limited to the embodiments described herein, but various modifications and changes may be made. According to the embodiments, the holder member 92 is a relatively large unit. However, the holder member 92 may be other component as long as it can support the lower surface or the like of the cross dichroic prism 60. For example, a seat plate for fixing the lower part of the cross dichroic prism 60 is supported by the frame member 91, and the expanding and contracting member 94 is disposed between the seat plate and the frame member 91. In this case, the expanding and contracting member 94 can be incorporated at a position relatively close to the cross dichroic prism 60.

The shape and the like of the expanding and contracting member 94 are only examples and thus may be other shapes as long as the expanding and contracting effect can be offered. In addition, plural units of the expanding and contracting members 94 and 194 may be interposed between the frame member 91 and the holder member 92.

The lamp included in the light source lamp unit 21 in the embodiments may be of various types such as a high-pressure mercury lamp and a metal halide lamp.

While the projector including the transmission type liquid crystal light valves 50r, 50g, and 50b has been discussed in the embodiments, the invention is applicable to a projector including a reflection type liquid crystal light valve. The "transmission type" herein refers to a type which is a liquid crystal light valve having a liquid crystal panel and the like capable of transmitting light. The "reflection type" corresponds to a type which is a liquid crystal light valve capable of reflecting light.

According to the embodiments, the main optical device 11 modulates the respective color lights by using the color separation light guide system 40, the liquid crystal light valves 50r, 50g, and 50b, and other units. However, color light modulation and synthesis can be performed by using a combination of a color wheel illuminated by the illumination device 20 and a device (light valve) constituted by pixels of micro mirrors and receiving transmission light from the color wheel in place of the units used in the embodiments. In this case, the micro mirror type light valve substituted for the cross dichroic prism 60 is supported by holder member 92.

The structure of the projector 10 shown in FIG. 1 and other figures is applicable to both a front projection type projector which projects images from the projection surface viewing direction, and a rear projection type projector which projects images from the direction opposite to the projection surface viewing direction.

While only the example of the projector 10 which includes the three liquid crystal light valves 50r, 50g, and 50b has been discussed in the embodiments, the invention is applicable to a projector including one or two liquid crystal light valves, and a projector including four or more liquid crystal light valves.

The entire disclosure of Japanese Patent Application No. 2009-102748, filed Apr. 21, 2009 is expressly incorporated by reference herein.

What is claimed is:

1. A projector comprising:
a light source,
a display device which modulates illumination light from the light source;
a projection lens which projects modulation light modulated by the display device;
a holding device which has a holder member supporting the display device;
a frame member supporting the projection lens; and
an expanding and contracting member being configured to move the holding device, which the direction of the motion of the display device is the same as the direction of the motion of the back focus position of the projection lens when the temperature is changed.

2. The projector according to claim 1, wherein:
the expanding and contracting member is disposed slidable on the frame member.

3. The projector according to claim 1, wherein:
the display device is arranged on the back focus position of the projection lens.

4. The projector according to claim 1, wherein:
the expanding and contracting member is disposed between the holder member and the frame member;
the temperature coefficient for the increase and decrease of the focal distance of the projection lens is a positive value;
the temperature coefficient for the expansion and contraction of the expanding and contracting member is a positive value;
an optical path downstream end of the expanding and contracting member is connected with a part of the frame member; and
an optical path upstream end of the expanding and contracting member is connected with a part of the holder member.

5. The projector according to claim 1, wherein:
the expanding and contracting member has a plurality of expanding and contracting element members; and
the plural expanding and contracting element members are connected and laminated in series.

6. The projector according to claim 1, wherein the display device has a liquid crystal light valve for respective colors receiving illumination lights in the respective colors, and a color combining prism which combines the lights in the respective colors modulated by the liquid crystal light valve for the respective colors to form the modulation light.

7. The projector according to claim 6, wherein:
the liquid crystal light valve for the respective colors is supported on a light entrance surface provided on the color combining prism; and
the color combining prism is supported by the holder member.

8. The projector according to claim 7, wherein:
the holder member has a support stand for supporting the color combining prism; and
the expanding and contracting member is disposed between the color combining prism and the support stand.

9. The projector according to claim 8, wherein;
the support stand has a fixing portion for positioning and fixing the expanding and contracting member, and a long hole having the longitudinal direction corresponding to the direction of the optical axis of the projection lens; and
the expanding and contracting member has a fixed portion fixed to the fixing portion, and a pin-shaped movable member inserted into the long hole such that the movable member can slide in the direction of the optical axis.

10. The projector according to claim 1, wherein the holder member supports a micro mirror type light valve.

* * * * *